United States Patent [19]

Nicolay

[11] Patent Number: 5,658,511
[45] Date of Patent: Aug. 19, 1997

[54] METHOD OF MANUFACTURING MOLDED ARTICLES

[75] Inventor: Albert Nicolay, Meinhard-Neuerode, Germany

[73] Assignee: Lignotock GmbH, Germany

[21] Appl. No.: 444,525

[22] Filed: May 19, 1995

[30] Foreign Application Priority Data

May 20, 1994 [DE] Germany .......................... 44 17 836.0

[51] Int. Cl.$^6$ .......................... B29C 43/04; B29C 43/18
[52] U.S. Cl. .......................... 264/112; 264/122
[58] Field of Search .......................... 264/112, 122

[56] References Cited

U.S. PATENT DOCUMENTS

| | | | |
|---|---|---|---|
| 4,505,869 | 3/1985 | Nishibori | 264/115 |
| 5,064,592 | 11/1991 | Ueda et al. | 264/112 |
| 5,391,340 | 2/1995 | Mirous et al. | 264/112 |
| 5,480,602 | 1/1996 | Nagaich | 264/122 |

FOREIGN PATENT DOCUMENTS

| | | |
|---|---|---|
| 2845117 | 4/1980 | Germany . |
| 3441104 | 5/1986 | Germany . |

*Primary Examiner*—Mary Lynn Theisen
*Attorney, Agent, or Firm*—Young & Basile, P.C.

[57] ABSTRACT

A method of manufacturing molded parts, preferably having the same wall thickness, from mixtures of cellulose and/or lignocellulose fibers with more than 20% by weight of thermal binders, in which the molded article results from application of heat and pressure to fiber mat prefabricated therefrom. In a first step, the fiber mat undergoes preliminary compression as a planar, endless matted fiber fleece, with only a small degree of compression of the fiber composite, the matted fiber fleece containing at least 2% by weight of a binder which cross-links under heat, its "start-off temperature", i.e. the temperature at which cross-linkage begins, being lower than the softening temperature of the thermoplastic binder. The cellulose and/or lignocellulose fibers are provided, before production of the fiber composite, with a surface finish of the cross-linking binder. The fiber mat, slightly compressed in the first step, is in a second step heated in the form of a blank or of a web to at least the start-off temperature of the fiber finish. Compression is carried out before shaping of the molded article, which is held in this condition of density for the duration of the cross-linkage of the fiber finish. Finally the preferably planar fiber mat, is shaped by the application of pressure to form the finished molded article, in a press tool whose temperature lies below that of the heated fiber mat.

3 Claims, 2 Drawing Sheets

METHOD OF MANUFACTURING MOLDED ARTICLES

BACKGROUND OF THE INVENTION

The invention relates to a method of manufacturing molded articles.

Mixtures of polypropylene and wood particles are known in specialist circles by the term HMPP (wood dust polypropylene). In this instance the workpiece mixture is produced in panel form by extrusion, if necessary with additional calendering. The wall thickness of these panels correspond to the thickness of the later molded article. The HMPP panels are heated by radiant heating to the softening temperature of the polypropylene. The panels are thereafter shaped by appropriate shaping procedures such as vacuum deep drawing, compression in a tool comprising male and female mold sections or the like, to produce the respective molded article required. In this case the temperature of the tools lies below the softening temperature of the polypropylene, so that during shaping, the material is cooled, and the molded article may be removed from the tool in a dimensionally stable condition.

This procedure in the shaping of HMPP panels has the advantage of simplicity and ease of monitoring the production process. However, a series of drawbacks stand in contrast to this advantage. For example, a high proportion of cost-intensive polypropylene is required in order to make the HMPP panels sufficiently flowable and thus deformable. According to the state of the art, the minimum proportion of polypropylene comes to more than 50%. This is not only disadvantageous for reasons of cost, but also has a negative effect on the properties of the molded articles. The dimensional strength of the molded articles in the higher-temperature range increases with an increasing proportion of wood particles, and its brittleness decreases in the low-temperature range. An increase in the proportion of wood particles would therefore be desirable not only for reasons of cost but for the properties of the molded articles. However through the fact that a larger proportion of wood particles reduces the deformability of the panels, articles of complex shape can no longer be produced.

A further disadvantage in the known HMPP panels resides in the fact that, due to their dense structure and their low heat-conductivity, they can only with difficulty be heated in a continuous manner to the softening temperature of the propylene. A relatively lengthy heating-time is required for this purpose.

Molded articles manufactured from HMPP panels are being increasingly used as internal trimming components for motor vehicles. HMPP panels have low water absorption because of the high proportion of binder. As a result, they are, in this field of the application, and despite their heavy reliance on their mechanical parameters, for example temperature resistance, an alternative to corresponding molded articles. Molded articles are shaped with a relatively low binder proportion of less than 20% by deformation of a matted fleece and subsequent pressing in a hot press tool. Such molded articles, however, have the great advantage that with regard to their strength values, they are largely independent of temperature. On the other hand, due to their low binder content, they have worse parameters relating to water absorption. In 1980 there was proposed a method of manufacturing compressible panel material from cellulose-containing material and at least one thermoplastic binder, the cellulose-containing material and the thermoplastic binder being admixed, and the mixture being shaped into panel material in a heated state. (DE-OS 28 45 117). Here the cellulose-containing material is pulped into fibrous material and mixed with the thermoplastic binder. A fleece is formed from the mixture, and the fleece is compressed to form panel material by the application of heat and pressure. This method was intended to enable the simple and cost-effective production of panel material characterized by good homogeneity and mechanical properties, which may be finally pressed in a simple way to produce high-quality molded articles. As cellulose-containing material, there was preferably used waste from cellulose fiber materials, which was communicated by chipping and pulped by dry milling, and adding thermoplastic binder in the form of dry powder.

It is also known from the prior art to add to the mixture duroplastic binders in the form of dry powder, the proportion by weight of the duroplastic binder preferably being 3 to 6% with respect to the overall proportion of binder.

Polyethylene, polypropylene, polyamide or the like may be used as a thermoplastic binder, conventionally with a weight proportion of more than 40%, and preferably 50 to 60%, so that the weight proportion of the fiber material is at most equal to the weight proportion of the binder.

This procedure does make it possible to transfer a series of advantages of fiber fleece mat technology to the HMPP technology, which is advantageous in manufacturing terms. However, it still has serious drawbacks. Even 14 years after this procedure became known, no relevant marketable product has been manufactured to date. The essential reasons for this can be summarized as follows:

In this method, a proportion of 50% by weight and over of thermoplastic material is required. At densities of 0.8 g/cm$^2$ to 1.4 g/cm$^2$, the molded articles have no further air permeability for corresponding molded articles, and therefore present problems during subsequent lamination processes.

The aim of incorporating duromeric binders—preferably in powder form—is an improvement in the dimensional stability of the molded articles under heat stress. In reality the heating-times before shaping are so long that the duromeric binder polymerizes out during the heating stage, and thus remains ineffective for the bond. During heating to softening temperature, the semifinished panels expand. The duromer reacts out in this condition, and is lost for reinforcement of the bond.

Of the large proportion of thermoplastic binders, only polypropylene is feasible in practice for technical and economic reasons, particularly with regard to the softening temperature. The large proportion of thermoplastic binders provides an added complication because of the separating effect in subsequent lamination. The lamination, advantageous in itself, is only possible in a working step with mold shaping. In this case however, the lamination cannot be placed around the lateral contour of the molded article, i.e. bent over, so that the field of application of the molded articles is severely limited.

When fibers are used with an extremely low water content, a position from which the prior art proceeds, difficulties arise in heating during production of the semifinished panels, as heat-transmission by means of evaporating water is eliminated. The procedure in which the still-loose fiber mat is permeated during manufacture by a gaseous heating medium is, on the one hand, expensive, and on the other hand, requires flow velocities which lead to fine particles being blown out of the mat. Renewed heating to softening temperature before mold shaping of the semifinished panels in a conventional manner with the mold presses used previously, i.e. preferably with radiant heat, takes too long, and renders the duromeric binders ineffective.

In all, the advantages of a procedure according to DE-OS 28 45 117, compared to the prior art represented by the HMPP technology, are small for the same investment, so that to date economic utilization has not been possible.

SUMMARY OF THE INVENTION

The purpose underlying the invention is therefore to indicate a method of the type already described by means of which molded articles may be produced from a composite material of thermoplastic binders, cellulose or lignocellulose, whose strength characteristics are less dependent on ambient temperature compared to prior art, which are air-permeable over their entire surface, and which are capable of lamination by all methods belonging to prior art.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
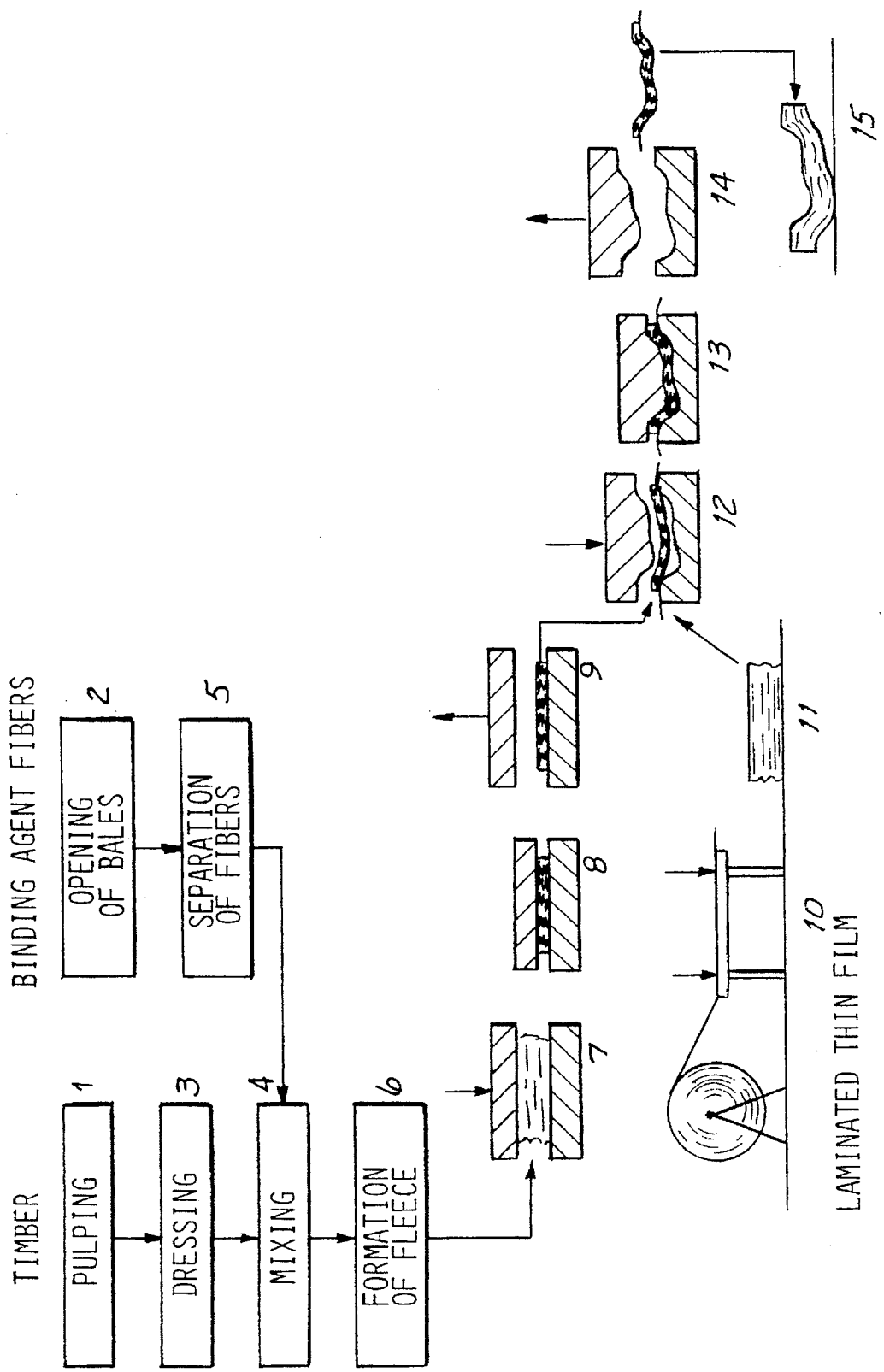
FIG. 1 illustrates the process for manufacturing molded articles according to the invention.

In FIG. 1 the individual steps of the process according to the invention are identified by the numerals 1–15. Steps 1–6 relate to the preparation of the slightly compressed mat, which serves as a semiproduct for production of the molded part, and steps 7–15 explain the actual production of the molded part.

Pulping of the timber (steps 1) is effected by methods already belonging to prior art, for example with a defibrator. Dressing of the wood fibers (step 3) with a wetting binding agent, e.g. with a phenolic resin, is likewise carried out by known techniques. It is possible to undertake dressing by jet-washing into the fiber flow at the outlet from the defibrator. However, separate adhesive application drums may also be used to dress the wood fibers.

In parallel with the preparation of the wood fibers, the thermoplastic binding agent is prepared, used in the present example in fiber form, e.g. in the form of polypropylene fibers. Such fibers are supplied in bales, which are firstly "opened" (step 2) before these fibers are separated by carding or other known methods (step 5), in order to prepare them for mixing with the wood fibers (step 4). The mixing of wood and binding agent fibers, and the formation from the fiber mixture of a fleece which is slightly compressed and capable of being handled has for a long time been a proven part of prior art. Blanks of this fleece are subsequently heated between pressure plates to the melting temperature of the binding agent fibers, compressed to the density of the later finished part.

In steps 7, 8, 9, and thereafter the heated and compressed fleece is transferred into the press tool by which the molded part is finally made (steps 12 to 14). After opening the press tool, the finished part is stacked (step 15). The press tool is "cold", i.e. its temperature is lower than the melting temperature of the binding agent fibers, and can be removed in a dimensionally stable manner from the tool.

Steps 10 and 11 indicate the trimming of a decorative thermoplastic film by means of which the visible side of the molded part is finished. The blanks of these films are inserted into the press tool together with the heated and compressed mat. The quantity of heat given off by the heated mat to the film renders the latter deformable, and the molten binding agent fiber ensures a permanent bond during the common removal of mat blank and film from the mold.

Figure 2:
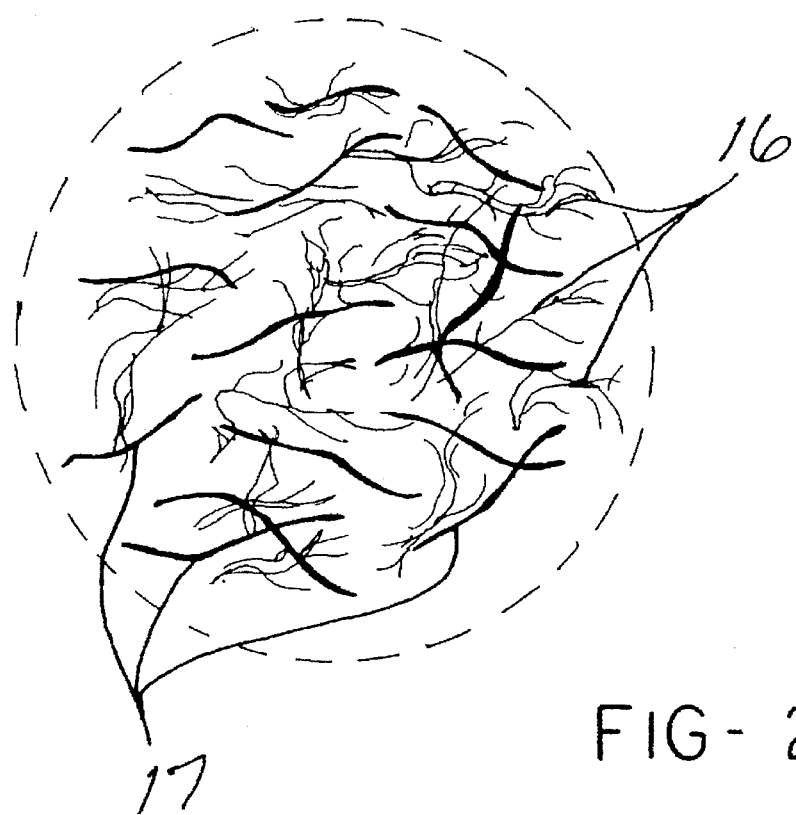
FIG. 2 shows a view of a detail portion of the fiber mat texture before heating.

FIG. 2 shows an enlarged detail of the fiber fleece mat, i.e. of the mat which is still slightly compressed, as it appears after fleece formation in step 6. The ramifying wood fiber is indicated generally at 16. The binding agent fiber is indicated at 17. The fibers form a non-directional random fleece of low density.

Figure 3:
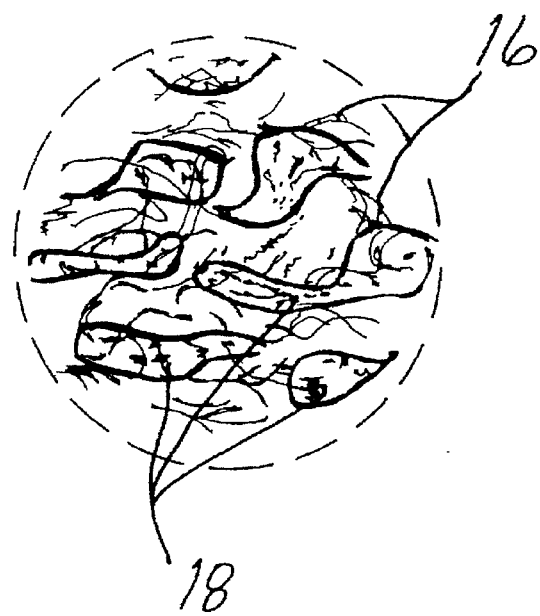
FIG. 3 shows a view of the detail portion of the fiber mat texture after heating and compressing according to the invention.

FIG. 3 shows the same detail of the fiber fleece mat as FIG. 2 after heating and compression to the final density (step 9). The binding agent fibers are molten, and form large molten areas 18, which join the wood fibers together without suppressing the air permeability of the material, and therefore also of the finished part.

By virtue of the fact that the cellulose and/or lignocellulose fibers are given a surface finish before treatment with the cross-linking binder, it is ensured that this binder reinforces and stiffens at least the wood fibers themselves, so as to increase their strength. Due to the fact that the fiber mat, slightly compressed in the first step, is heated during a second method step to at least the start-off temperature of the fiber finish and preferably to the softening temperature of the thermoplastic binder, before shaping into the molded article, and compressed to the density thereof; and due to the fact that the molded article is held in this density condition for the duration of the cross-linkage of the fiber finish, there arises the advantage that the cross-over points of the wood fibers are also bonded in a duromeric manner. In this respect compression to the density of the molded article increases the number of these fiber cross-overs, so that there results within the overall bond a type of "spatial support mesh". The mesh retains its strength in heat also, and the subsequent shaping by methods known per se is substantially simplified, so that even complex shaping is possible without adding outlay.

The compression according to the invention to the density of the molded article has two further advantages:

1. Heat-transmission in the compressed condition is substantially improved compared to the loosely-connected matted condition.

2. The lower density of the fiber mat obtained by compression to a large extent prevents clamping and shearing during mold shaping. In co-operation with the tension-resistant fiber framework there results a considerably improved deformability which enables reduction of the proportion of thermoplastic binders.

It is thus possible, for example, to use a composite which is characterized in that the thermoplastic binder is added in a maximum proportion of 40% by weight during formation of the fiber mat. The fiber mat is compressed during production of the molded article to a maximum density of 0.8 $g/cm^2$, and that wood fibers are predominantly used as fibers, with a length of 1 to 10 mm, which have been given a finish of 8% phenolic resin before formation of the mat. A molded article produced from this material is air-permeable over its entire surface, due to the increased proportion of wood fibers and the bond strength used for the duromer. The molded article is heat-resistant in terms of the conventional product specification and; end as a result of the large surface proportion of the wood fibers, may also be easily laminated subsequently.

Heating of the mat blank and its compression to the density of the molded article can be effected in a simple way between two preferably planar heating plates coated with anti-adhesive material. The plates are capable of being pressed together in a simple press. A surprising result of this was that the natural moisture of the finished wood fibers was not disruptive. Analogously to the pressing of previous wood fiber mats into molded articles by the formation of steam, improved heat-transfer is ensured. Therefore, heating-up times of approximately 60 seconds are at present achievable. Temperatures of 220° C. and over may also be achieved with heated press plates, which have proved the best in the procedure according to the invention.

An increase in the proportion of wood fibers, and utilization of the duromeric binder for consolidating the fibers and for heat stabilization of the fiber mesh in procedures according to the invention, improve the impact resistance of the molded articles and increase the resistance to splintering at low temperatures. This provides a considerable contribution to passenger safety in vehicle accidents.

All percentage details relate to percentages by weight with respect to the mat dry weight, i.e. without moisture content. After heating of the condensed fiber mat, it may be shaped in a known way in a "cold" tool, i.e. in a tool whose temperature lies below that of the heated fiber mat, by application of pressure, to form the finished molded article. All the advantages of cold shaping, such as simplified tools and shorter operating cycles, may therefore be used.

Apart from the advantages described of the procedure according to the invention, many advantages known per se of the previous state of the art remain usable. The thermoplastic binder may be added at least in part in fiber form. Contrary to the addition of such in powder form in the milling process for dry fibers, the binder then participates in the fleece-formation process, and the result is a well-mixed homogeneous fiber fleece.

Surface layers, for example lamination, may be connected with high adhesive strength to the fiber mat in the so-called "one-shot" process in shaping the molded article, as with HMPP technology.

Heat-resistant long fibers, i.e. fibers with a length of more than 10 mm, which may be natural or synthetic fibers, may even be worked into the fiber composite in a proportion of 5 to 20% by weight, preferably 8 to 10% by weight. These improve impact resistance and deformation behavior, particularly when their good strength characteristics are fully utilized by preferably locating them in the outer layer region of the mats.

Mold articles produced according to the invention contain less thermoplastic binder than HMPP panels. In a procedure involving a pressure stroke it can therefore be advantageous to provide the surface of the mat to be laminated with a hot-melt adhesive layer, roughly in the form of a fleece or of a thin film. Thus perfect adhesion of the lamination is reliably obtained.

All appropriate types of fibers and binders can be considered as a material. Polypropylene fibers will preferably be used as thermoplastic binders, and wood fibers as the main fibers. The cross-linking finishing agent for the fibers is preferably selected from the group of phenolic resins. Depending on the type of fiber, however, another duromer, for example a polyurethane, may be appropriate.

What is claimed is:

1. A method of manufacturing molded parts from mixtures of at least one of cellulose and lignocellulose fibers with more than 20% by weight of thermal binders, and at least 2% by weight of a binder which cross-links under heat, at a temperature at which cross-linkage begins, wherein the temperature is lower than the softening temperature of the thermoplastic binder by application of heat and pressure, the steps comprising:

giving the at least one of cellulose and lignocellulose fibers a surface-covering finish of the cross-linking binder;

mixing the coated at least one of cellulose and lignocellulose fibers and the thermoplastic binder and forming of this mixture a slightly compressed fiber mat as a planar, endless web;

cutting off a blank of needed size from said fiber mat, heating and compressing this blank at least to the softening temperature of the thermoplastic binder and to the density of the molded part;

holding the fiber mat at said density for the duration of the cross-linking time of the fiber coating; and shaping the fiber mat by the application of pressure, in a press tool wherein the press tool has a temperature below that of the heated fiber mat.

2. The method according to claim 1, further comprising the step of:

adding the thermoplastic binder at least partly in fibrous form.

3. The method according to claim 1, wherein the shaping of the molded part step further comprises the step of strongly bonding a surface layer to the fiber mat.

* * * * *